United States Patent [19]
Solhjell et al.

[11] Patent Number: 5,375,245
[45] Date of Patent: Dec. 20, 1994

[54] APPARATUS FOR AUTOMATICALLY REDUCING THE POWER CONSUMPTION OF A CRT COMPUTER MONITOR

[75] Inventors: Erik Solhjell, Oslo, Norway; Tang P. San, Singapore, Singapore

[73] Assignee: Tandberg Data A/S, Oslo, Norway

[21] Appl. No.: 20,374

[22] Filed: Feb. 22, 1993

[51] Int. Cl.⁵ .......................... G06F 1/32; G06F 3/14
[52] U.S. Cl. ................... 395/750; 345/212; 364/237.2; 364/237.3; 364/273.1; 364/DIG. 1; 364/707
[58] Field of Search ........... 395/750, 275; 364/707; 365/227; 345/211, 212

[56] References Cited

U.S. PATENT DOCUMENTS

| | | | |
|---|---|---|---|
| 3,453,601 | 7/1969 | Bogert et al. | 364/707 |
| 3,941,989 | 3/1976 | McLaughlin | 364/707 |
| 4,722,005 | 1/1988 | Ledenbach | 358/168 |
| 4,823,121 | 4/1989 | Sakamoto et al. | 340/781 |
| 4,922,448 | 5/1990 | Kunieda et al. | 345/1 |
| 5,167,024 | 11/1992 | Smith et al. | 395/375 |
| 5,178,152 | 1/1992 | Ozawa | 128/680 |
| 5,245,312 | 9/1993 | Kiuchi et al. | 340/309.4 |
| 5,315,311 | 5/1994 | Honkala | 345/76 |

*Primary Examiner*—Gopal C. Ray
*Attorney, Agent, or Firm*—Hill, Steadman & Simpson

[57] ABSTRACT

A method and apparatus for automatically undertaking power reduction of a monitor in a computer system make use of the fact that, when the computer system is active, synchronization pulses will be transmitted to the monitor. In the method and apparatus herein, it is insured that when the computer system is inactive, transmission of those synchronization pulses ceases. Within the monitor, the reception of these synchronization pulses is detected, and in the absence of synchronization pulses, steps are taken to reduce the power consumption by the monitor. Power can be discontinued to different portions of the monitor as the length of time for which the synchronization pulses are absent increases.

8 Claims, 4 Drawing Sheets

APPARATUS FOR AUTOMATICALLY REDUCING THE POWER CONSUMPTION OF A CRT COMPUTER MONITOR

BACKGROUND OF THE INVENTION

1. Field of the Invention

The present invention is directed to a method and apparatus for automatically turning off a computer monitor when its associated computer is temporarily not in use, and for automatically turning the monitor on when use of the computer is resumed.

2. Description of the Prior Art

Computer systems generally consist of a computing unit 1 (which may have built-in storage devices like floppy disks, hard disks and tape drives), a keyboard 2 and a monitor 3, as schematically shown in FIG. 1. The computing unit 1 may also be connected with a printer and other peripheral devices.

These types of computing devices are often referred to as PC's (Personal Computers).

Another type of computing system is shown in FIG. 2, in this type of system a main computer 9 is connected to several terminals 10, such as by connection to the respective monitors 3, each with its own keyboard 2. The main computer 9 itself is typically more powerful than that of FIG. 1 in order to handle the workload from the combined group of terminals/monitors.

Several other configurations exist including a combination of FIG. 1 and FIG. 2, where each terminal 10 in FIGS. 2 actually consists of a computing device as shown in FIG. 1. This combination of centralized main unit and de-centralized PC-units is quickly gaining popularity among many data system users.

All these systems draw energy, and in many cases, the monitor itself uses a significant amount of energy to run properly. Typically, these systems stay on during the entire workday, even when they are not in active use. This means waste of energy. For a company with, approximately 500 employees each with his or her own PC, this power waste may easily reach many kilowatts every day. Heretofore, this has been accepted, but it is to be expected that much stricter requirements are going to be put on power conservation in computer systems in the future. This will be done both to save cost and also to protect the environment.

Although operators can be trained to turn the computer system off every time they leave their desk, most people will not find this practical. Therefore, system should be designed to perform this task automatically, and in a way which causes few, if any, problems or delays for the operator.

In principle, automatically saving energy by turning off the computer system is fairly easy. Small portable computers (laptop computers) have had such features for several years. The computer itself is designed so that if there is no activity from the keyboard or from other external inputs during a specified time, the computer shuts down as much as possible of its system to save energy. Only minimum logic is kept active to detect when the keyboard or other external inputs are becoming active again requiring that the rest of the computer system is turned on again.

In laptop computers, this power-saving feature is fairly simple to implement, since the monitor display is integrated with the computer system itself. However, for normal PC systems and similar systems as shown in FIGS. 1 and 2 in which the monitor is a separate item receiving the information to be displayed from the (separate) computer unit, the situation is more difficult. Because the computer unit must detect all activities from the keyboard or other internal/external sources, it is fairly easy to design the computer system itself so that a non-activity situation is detected and specified internal devices in the computer unit itself are turned off. However, turning off the external monitor automatically from the computer unit is much more difficult, since most monitor systems are based on very standardized data protocols operating at a very low "intelligence" level (EGA, VGA). The most common types of systems typically receive picture (video) information over a simple bus system where a few (3) lines transfer the color information (intensity) for each pixel or dot. Typically, these signals are analog. Additionally, synchronization signals such as vertical and horizontal synchronization are transferred either on separate digital lines or are embedded into the analog color lines (by driving the signal to a level "blacker than black" or "whiter than white"). FIG. 3 shows a simplified example using the very common VGA display mode. Monochrome monitors uses only the green line, with the red and the blue left inactive. FIG. 4 shows an example of synchronization pulses embedded in an analog color signal.

Such standardized video monitor systems contain no means for sending special commands over the same bus, i.e., but, for example, orders to turn the power on or off.

It would be possible in theory to design a video monitor system in which such special commands could be sent to the monitor to turn it on and off. These could either be sent on special lines, or on the same lines as the normal picture by using some special predefined commands. However, today's monitor systems are (as already mentioned) highly standardized. To introduce such a new system with special commands into today's standardized computer world would be very difficult insofar as commercial acceptance.

As already mentioned, the computer unit itself can fairly easily detect that a certain time has passed with no activities from the keyboard (or other internal/external sources) and can then for example, physically turn off the AC power to the terminal or video monitor. No special commands, etc. between the computer unit and the terminal are required to perform this task. However, such a system will have the serious drawback that the normal CRT monitor will require considerable time to warm up again when the computer system is reactivated.

SUMMARY OF THE INVENTION

It is an object of the present invention to provide a personal computer system which does not require any changes to the standard communication protocols used between the computer and the video monitor based on today's standards (such as EGA and VGA), but still allows for effective power control implementations inside the monitor itself.

The above object is achieved in accordance with the principles of the present invention in a method and apparatus wherein the reception of the synchronization pulses is detected within the monitor, and steps are initiated within the monitor to reduce power consumption by the monitor in the absence of synchronization pulses. The steps for reducing the power consumption can be undertaken in a sequence, with an increasing number of components within the monitor being shut down as the length of time increases during which the synchronization pulses are absent. Eventually, the entire monitor power consumption can be shut down, with the exception of a small amount of power necessary to continuously power the synchronization pulse detector within the monitor, so that when the synchronization pulses resume, when the computer system becomes active again, the monitor can be re-energized.

DESCRIPTION OF THE PREFERRED EMBODIMENTS

As noted above, video using popular protocols like VGA, rely on the pixel data being transferred in an analog form from the computer unit to the monitor. Synchronization signals (or signal components) may either be transferred by dedicated digital lines or superimposed on the analog color lines. (Some systems operate with digital data transfer. Although far less popular, this invention is also easily adapted for use with these systems.)

Figure 3:
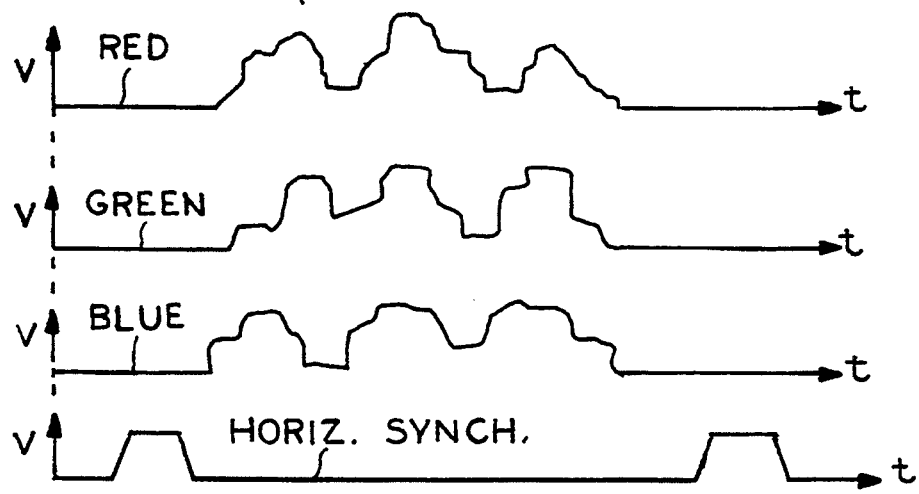
FIG. 3, as noted above, shows simplified typical VGA signal patterns.
Figure 4:
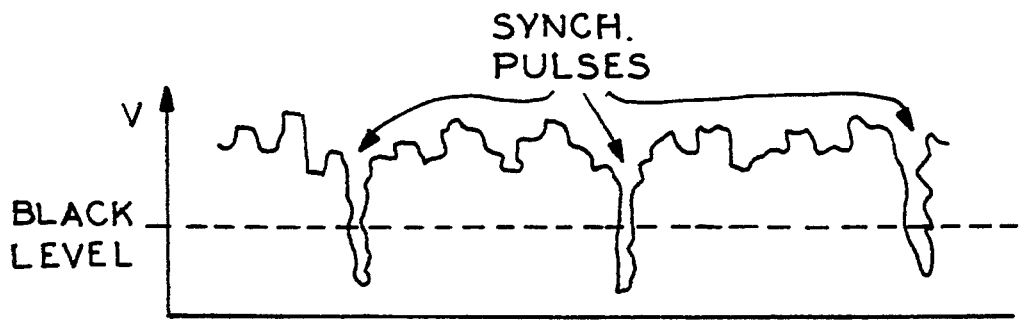
FIG. 4, as noted above, shows an analog pixel signal with synchronization pulses embedded therein.

As discussed above, FIG. 3 shows a typical VGA system with three analog color signals and digital synchronization signals (normally two). As already mentioned, some other video systems integrate the synchronization signals into the analog pixel signals as shown in FIG. 4.

Regardless of whether the synchronization signals are transferred on separate digital lines or embedded into the analog pixel signals, they play a vital part of the system operation by making sure that every picture is synchronized. These synchronization signals are therefore transferred in a rigidly fixed manner from the computer unit, while the analog pixel signals will vary depending upon the picture itself. For example, on a black screen in VGA mode, all three color signals will have 0 volt level, while a complete white screen will have constant maximum level (approx. 3 volts) on all three color lines. Therefore, the analog color lines are not suitable to determine if any activity exists on the computer side. However, the synchronization signals are ideally suited for such a use.

Therefore, although the actual method used to transfer the synchronization signals from the computer unit to the video monitor may vary, the important recognition for this invention is that all these video systems utilize some form of synchronization signals which are transferred on a regular basis regardless of the picture contents. All monitor designs include special electronic circuitry designed to detect these synchronization signals.

Figure 5:
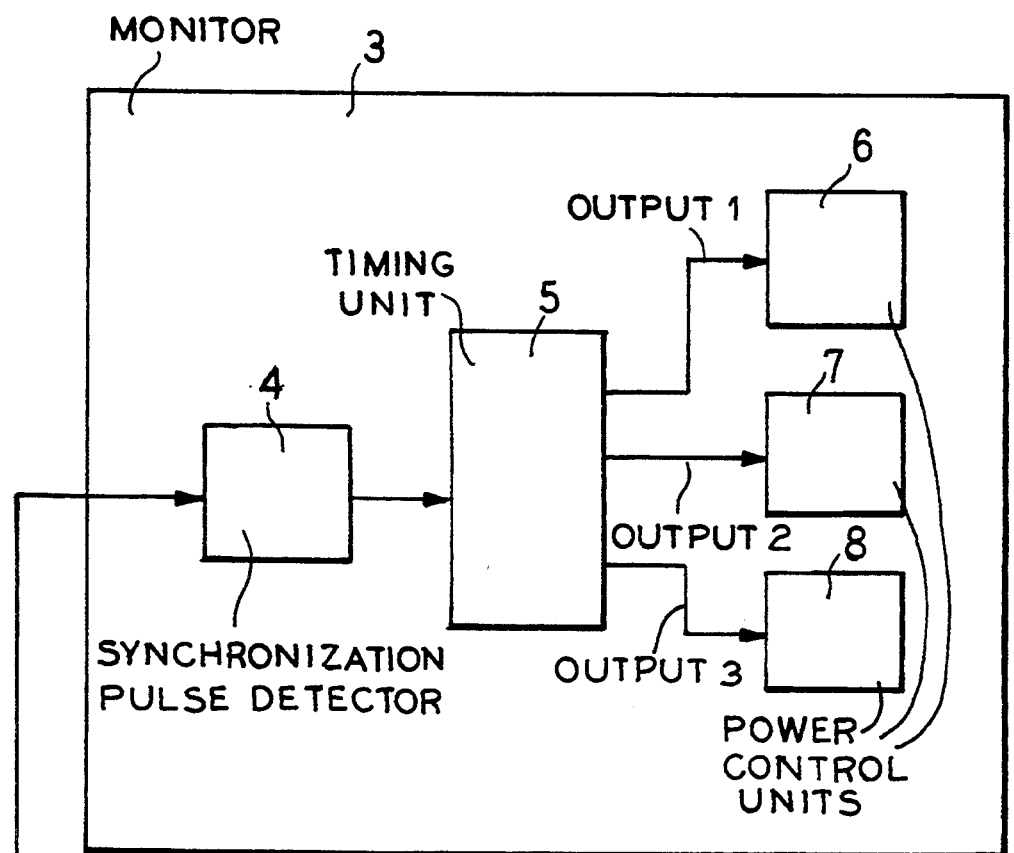
FIG. 5 is a schematic block diagram of an apparatus for automatically reducing power consumption by a monitor in a computer system, constructed in accordance with the principles of the present invention.
Figure 5:
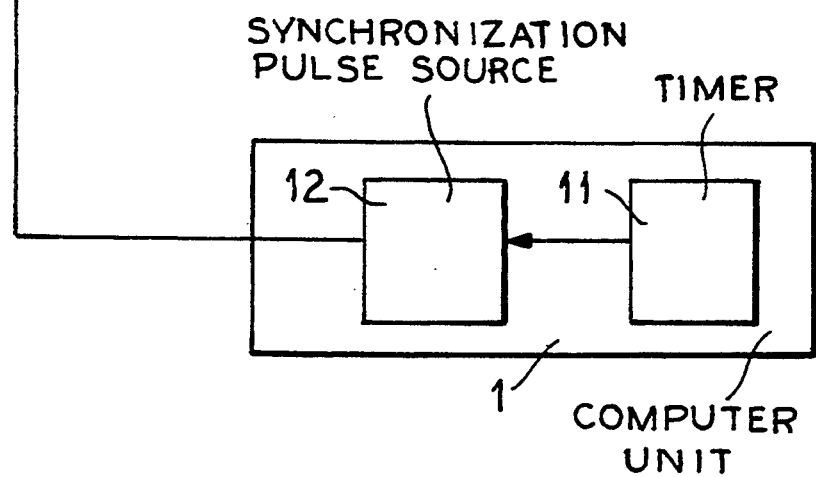

The invention makes use of these synchronization signals to control the power system of the monitor. The basic elements of an apparatus constructed in accordance with this invention are shown in FIG. 5.

As already mentioned, all monitors have electronic circuitry designed to detect the synchronization pulses, regardless of the method by which these signals are transferred. In FIG. 5 this circuitry is designated "Synchronization Detector" 4. The invention requires that every time a synchronization signal is detected, a trigger signal is sent to a special timing unit 5. This timing unit 2 operates so that if no pulses are received within a specified time limit, it sends a signal to a power control unit which in turn controls the turning off (and on) of a certain portion of the monitor system. In FIG. 5, three power control circuits 6, 7 and 8 are shown assumed, each designed to turn a certain portion of the monitor electronics off (or on).

For example, the timing unit 5 may be designed so that it triggers power control unit 6 after, for example, 15 seconds without any synchronization pulses; and further made so that it triggers power control unit 7 after, for example, 10 minutes without any synchronization pulses.

Each of these power control units activates a certain power conservation scheme in the monitor. For example, power control unit 6 may be used only to blank out the picture, leaving it dark (but the CRT still on). It may also turn off some of the logic not required as long as there is no picture processing taking place. Power control unit 7 may be designed to reduce the CRT heating to a minimum so that it will require a short time to return it to an active status. It may also turn off other parts of the electronic circuitry, for example, most of the analog system driving CRT. Power control unit 8 may shut the CRT completely off as well as the rest of the electronics not already shut down during the first two phases. The only circuitry which needs to be active is the circuitry controlling the power off/power on operation; i.e., basically the circuitry of FIG. 5.

The total system operation is then as follows: The computer unit 1 is constructed in accordance with the invention so that it turns off synchronization pulses to the monitor 2 when there has been no activity from the keyboard 3 or by other connected sources for a given time, for example 1 minute. This is schematically shown in FIG. 5 by a timer 11 operating on a synchronization pulse source 12 in the computer unit 1. The timer 11 may also be designed so that it activates special power saving activities within the other electronics of the computer unit 1 at the same time, but this is not a part of this invention. However, the computer unit 1 reactivates the synchronization pulses (and the rest of its internal electronics) immediately upon detection of new activity for example from the keyboard.

The synchronization detector 4 in the monitor 2 will detect every synchronization pulse sent from the computer unit 1 and feed these pulses to the timing unit 5. Every such pulse will reset the timing unit 5 and the power control units 6, 7 and 8 will stay inactive. The monitor 2 will operate normally. However, should the computer unit 1 shut off the synchronization pulses (because there has been no activity for a specified time), the timer unit 5 in the monitor 2 will not be reset. It will then trigger power control unit 6, after a predetermined delay of, for example, 15 seconds (this and the other delays can be programmable). It will further trigger power control unit 7 if the synchronization signals have been missing for a longer time, (for example, 120 seconds) and then trigger power control unit 8 if the synchronization pulses have been absent for an even longer period (for example, 5 minutes). Each of these power control units will then turn off a portion of the monitor system as described earlier.

When the computer unit 1 detects activity and thus activates synchronization pulses, the timer unit 5 in the monitor 2 is immediately reset, turning off the power control units. Depending upon which of these power control units was active, the monitor 2 may need from almost 0 seconds to perhaps 30 seconds or more to get ready for operation again.

Figure 6:
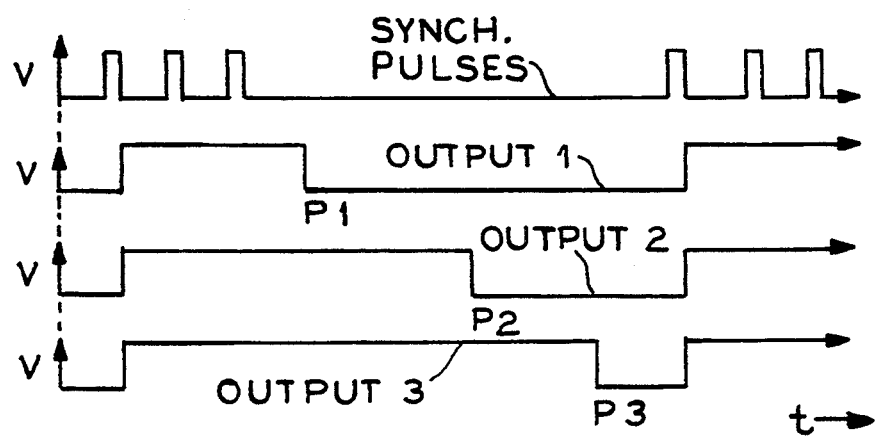
FIG. 6 shows a timing diagram for a power control unit in accordance with the principles of the present invention.

FIG. 6 shows a simplified timing diagram of this operation. As long as the monitor 2 receives the synchronization pulses, none of the power control circuits are enabled. A certain time after the synchronization pulses have stopped timing unit output 1 activates power control unit 6 at point P1. After some more time has elapsed, output 2 is activated (point P3). In this embodiment a power unit is activated when the output thereto from the timing unit 5 goes low. As soon as the synchronization pulses start to arrive again, all three timing units are deactivated (outputs go high) turning off the power control units.

With this invention it is, therefore, possible to easily implement a power saving feature in video monitors used in typical computer systems without the need for any change in the protocols of picture transfer from the computer unit 1 to the monitor 2. Therefore, standard protocols used today in millions of systems such as EGA, VGA and SVGA, may be used as exactly as before. The only requirement is that the computer unit 1 be able to detect inactivity and thereby turn of the synchronization pulses.

Figure 1:
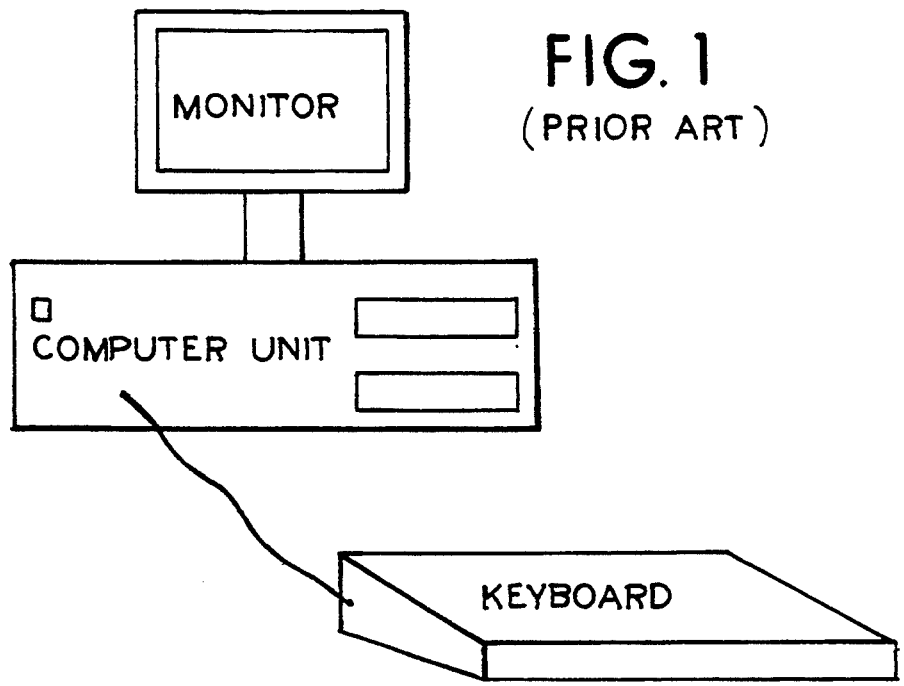
FIG. 1, as noted above, is a schematic block diagram of a typical personal computer system.
Figure 2:
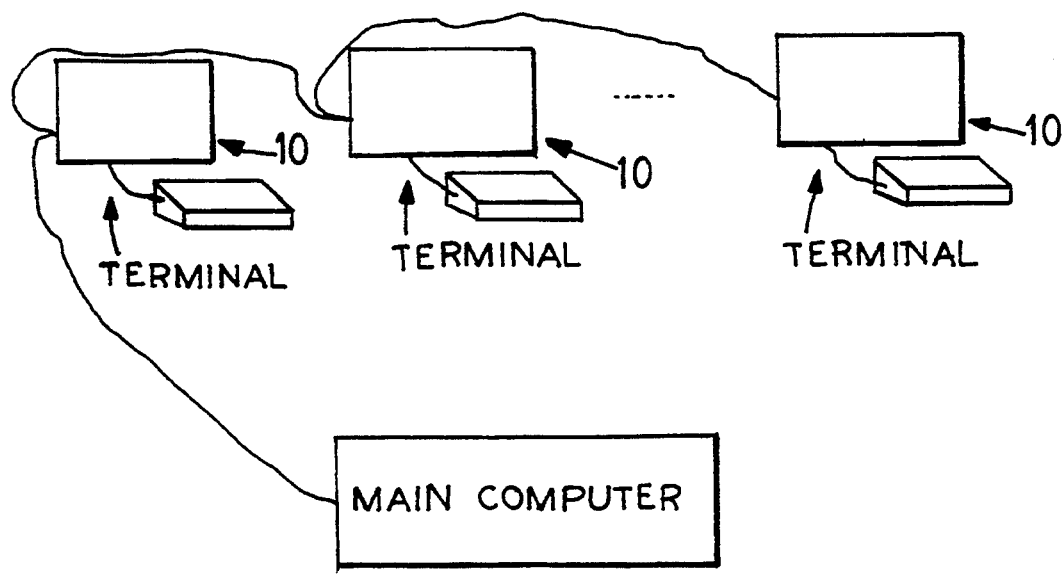
FIG. 2, as noted above, is a schematic block diagram of a typical centralized computer system.

This system will operate satisfactorily even if the computer unit 1 shown in FIG. 1 is configured in a larger networking system such as indicated in FIG. 2. Each of the machines designated terminal 10 will then be a computer system as shown in FIG. 1 with at least a monitor 2 and a keyboard 3, and possibly its own computing unit 1. By implementing power saving features as described herein in each device, the total system will become far more power efficient. Units not being actively used will turn themselves down (maybe in several steps as described here) while those units being used will work as normal. Power will be saved without the need for anyone to remember to shut off his or her computer system every time he or she leaves the system for a while.

Those skilled in the art may implement slightly different version of the power disclosed herein. The key, however, is not the type of power saving method used, but the fact that whatever method is employed is activated automatically by a simple system monitoring the absence of picture synchronization pulses.

Figure 8:
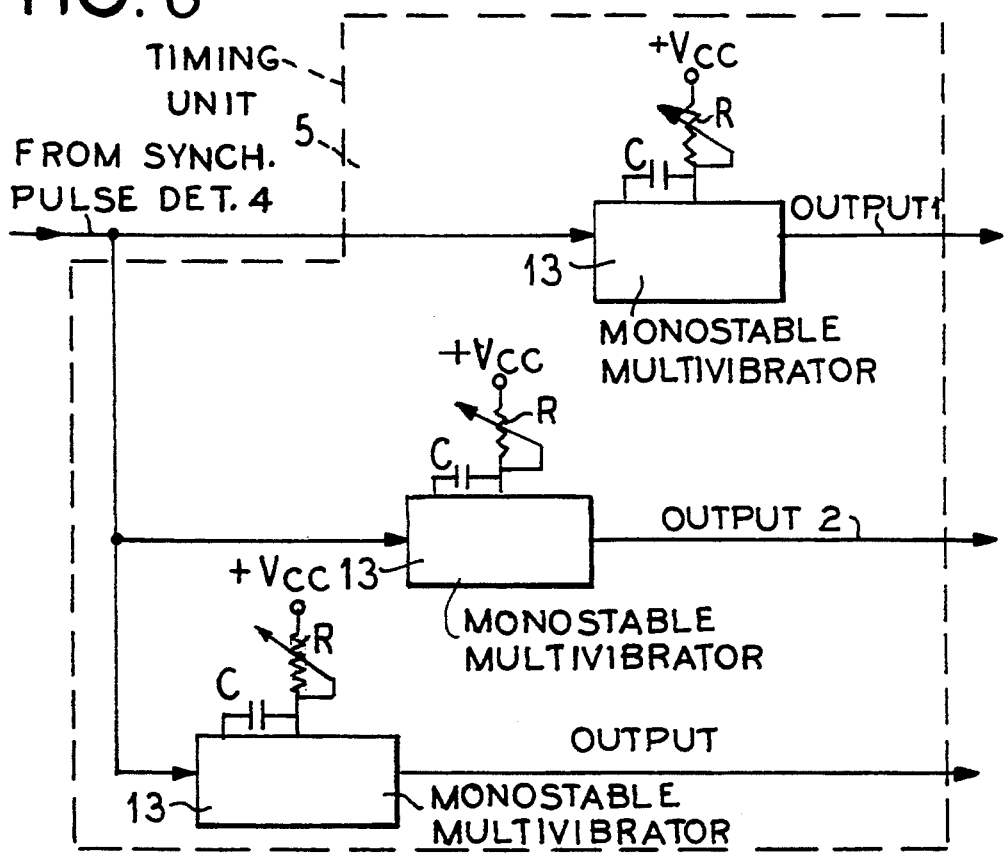
FIG. 8 is a schematic block diagram of a second exemplary embodiment of a circuit suitable for use as the timing unit in FIG. 5.
Figure 7:
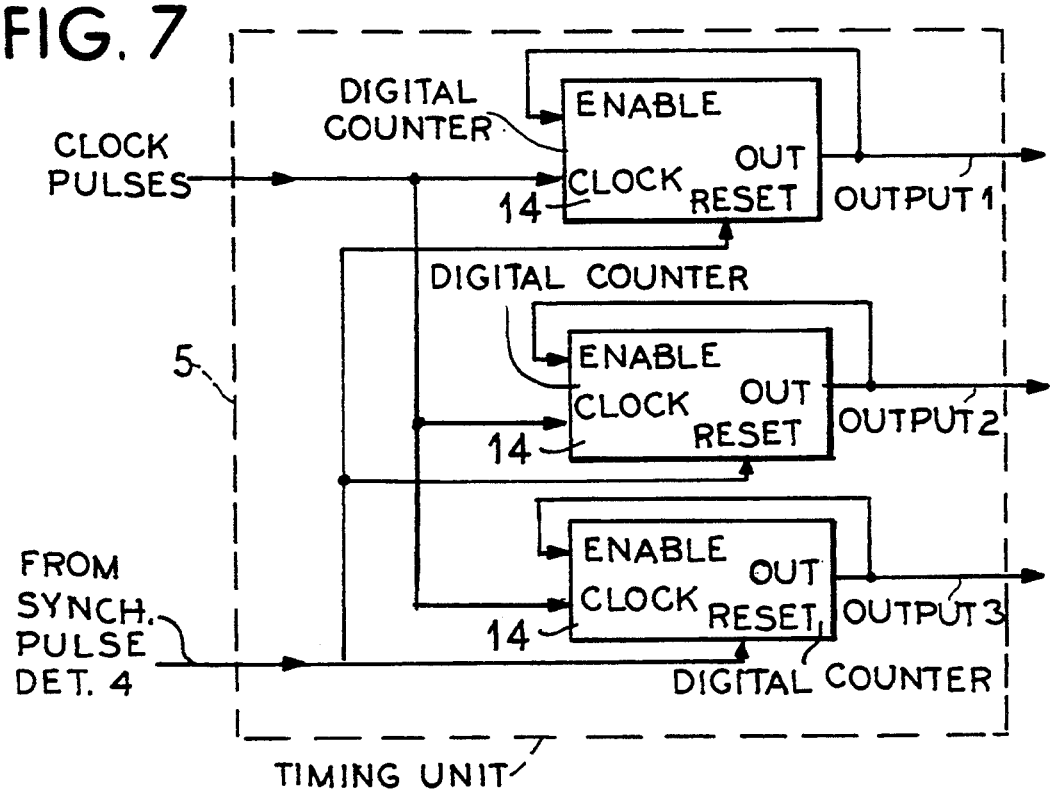
FIG. 7 is a schematic block diagram of a first exemplary embodiment of a circuit suitable for use as the timing unit in FIG. 5.

The timing unit may be designed in many different ways. FIG. 5, 7 and 8 respectively show different examples. FIG. 7 is based on the use of standard retriggerable monostable multivibrator circuits 13. One or more circuits may be used, each a different timing constant. A synchronization pulse will trigger all the monostable multivibrator circuits 13 and cause all the outputs to go high. The monostable multivibrator circuits 13 are retriggered each time a new synchronization pulse arrives. The timing constant for each of the monostable multivibrator circuits 13 will differ, but they will all have a timing constant far longer than the normal time between the synchronization pulses. The monostable multivibrator circuits 13 will, therefore, normally stay constantly in a retriggered mode with the outputs high. The timing constants may be made adjustable by the user by adjusting a potentiometer R connected to a capacitor C in each timing circuit.

FIG. 8 shows a different, more digital implementation of the timing unit 5. The design is based on the use of digital counters 14 (the figure assumes three independent timing units). Each counter 14 is clocked by clock pulses coming from an oscillator circuit in the monitor electronics (or derived from the AC power line, typically 50 or 60 Hz.) Each clock pulse will increment each counter 14 by one, provided that the counter 14 is enabled. The enable input of each counter comes from the counter's output. As long as this output is not active, the counter enable input will allow that counter to be incremented upon each clock pulse. However, when the counter 14 finally has reached a state at which the number of clock pulses has incremented it so that the output (typically one of the outputs from the internal flip-flops) goes active, this will simultaneously disable the counter 14 so that further counting is stopped. The counter 14 will, therefore, remain in a steady state with the output high until the counter 14 is reset.

Each counter 14 has a reset line connected to the synchronization pulse line. Each synchronization pulse will reset the counter 14. Therefore, under normal circumstances, when synchronization pulses are received on a constant basis, all the counters 14 are being continuously reset, and are not counting. Therefore, the outputs stay inactive.

However, as described earlier, should the computer unit 1 stop the synchronization pulses for a while, each of the counters 14 will start to increment. Again, these counters 14 may be designed so that each of them requires a different number of clock pulses before the counter output goes high. For example, the counter 14 associated with output 1 in the timing units may require 5000 clock pulses before its output goes active. The counter 14 associated with output 2 may require 25,000 pulses, while the counter 14 associated with output 3 may require, for example, 150,000 clock pulses. It can be assumed that the clock pulse signal has a rate of 50 Hz, i.e., the counters 14 receive 50 pulses per second.

As long as the synchronization pulses arrive at a regular frequency, all counters 14 remain reset. However, when the computer unit 1 shuts off the synchronization pulses, all the counters 14 are allowed to be incremented. The counter 14 associated with output 1 will activate its output after 5000 clock pulses. At a rate of 50 pulses per second, that means that the counter 14 output goes active after 100 seconds. It will then remain in this state because the active output disables the clock signal to the counter 14.

Output 2 will likewise go active after 25,000/50 seconds=500 seconds, while output 3 will go active after 150,000/50 seconds=3000 seconds.

Therefore, after 3000 seconds, all three counters 14 will have active outputs and remain so until the timing units are reset when the next synchronization pulse is received (or power turned off). The monitor 2 can also be designed so that a manual reset will be available.

These counters 14 can, of course, be made programmable on an individual basis for each output of the timing units. Additionally, the clock pulse train can be made adjustable to control the overall timing of the unit.

Those skilled in the art can design many similar kinds of circuitry performing the same kind of function, either as simple analog or digital circuits or based on, for example, the use of a microprocessor.

As already mentioned, some video monitor systems transfer data information in a digital form in addition to transferring the synchronization information on digital lines. This will not alter the operation of this invention. The insight of the invention is to utilize the synchronization signal(s) as a control signal for controlling the power system of a video monitor in a desired manner.

Although modifications and changes may be suggested by those skilled in the art, it is the intention of the inventors to embody within the patent warranted hereon all changes and modifications as reasonably and properly come within the scope of their contribution to the art.

We claim as our invention:

1. A method for automatically reducing power consumed by a CRT monitor having a plurality of electrical components in a computer system including said monitor and a computer unit, said method comprising the steps of:

transmitting color image signals and synchronization pulses for synchronizing display of said color image signals in an image from said computer unit to said CRT monitor in said computer system when said computer system is active;

ceasing transmission of said synchronization pulses from said computer unit to said CRT monitor when said computer system is inactive;

detecting, at said CRT monitor, reception of said synchronization pulses by said CRT monitor; and de-energizing at least one of said electrical components in said CRT monitor in the absence of detection of the reception of said synchronization pulses to reduce power consumption by said CRT monitor.

2. A method as claimed in claim 1 wherein the step of de-energizing at least one of said electrical components in said CRT monitor is further defined by de-energizing at least one of said electrical components in said CRT monitor after a predetermined delay following detection of the absence of said synchronization pulses.

3. A method as claimed in claim 1 wherein the step of de-energizing at least one of said electrical components in said CRT monitor is further defined by selectively ceasing power supply to different electrical components in said plurality of electrical components at different times in the absence detection of the reception of said synchronization pulses.

4. An apparatus for automatically reducing power consumed by a CRT monitor having a plurality of electrical components in a computer system including said CRT monitor and a computer unit, said apparatus comprising:

means for transmitting color image signals and synchronization pulses for synchronizing display of said image signals in an image from said computer unit to said CRT monitor in said computer system when said computer system is active;

means for ceasing transmission of said synchronization pulses from said computer unit to said CRT monitor when said computer system is inactive;

means disposed in said CRT monitor for detecting reception of said synchronization pulses by said CRT monitor; and means in said CRT monitor for de-energizing at least one of said electrical components in said CRT monitor in the absence of detection of the reception of said synchronization pulses to reduce power consumption by said CRT monitor.

5. An apparatus as claimed in claim 4 wherein said means for said CRT monitor comprises means for de-energizing at least one of said electrical components in said CRT monitor after a predetermined delay following detection of the absence of reception of said synchronization pulses.

6. An apparatus as claimed in claim 4 wherein said means for de-energizing at least one of said electrical components in said CRT monitor comprises means for successively disconnecting power from different electrical components in said plurality of electrical components at different times in the absence of detection of the reception of said synchronization pulses.

7. An apparatus as claimed in claim 6 wherein said means for de-energizing at least one of said electrical components in said CRT monitor includes a plurality of retriggerable monostable multivibrators, each having a different time constant, said monostable multivibrators being respectively connected to said electrical components in said plurality of electrical components and each monostable multivibrator shutting down the electrical component connected thereto after the elapsing of its time constant following detection of the absence of reception of said synchronization pulses.

8. An apparatus as claimed in claim 6 wherein said means for de-energizing at least one of said electrical components in said CRT monitor comprises a plurality of counters, each of said counters having an output status which changes upon the reaching of a different count, said counters being respectively connected to said electrical components in said plurality of electrical components and each counter shutting down the electrical component connected thereto when its count is reached following detection of the absence of reception of said synchronization pulses.

* * * * *